(12) United States Patent  
Masoner et al.

(10) Patent No.: US 8,399,825 B2  
(45) Date of Patent: Mar. 19, 2013

(54) SENSOR AND METHOD FOR DETERMINING AN ANGULAR POSITION OF A ROTOR

(75) Inventors: Garold W. Masoner, Saint Charles, MN (US); Gerard J. Zettler, Winona, MN (US); Jeridiah Welti, Plainview, MN (US)

(73) Assignee: TRW Automotive U.S. LLC, Livonia, MI (US)

( * ) Notice: Subject to any disclaimer, the term of this patent is extended or adjusted under 35 U.S.C. 154(b) by 794 days.

(21) Appl. No.: 12/257,317

(22) Filed: Oct. 23, 2008

(65) Prior Publication Data

US 2009/0134317 A1     May 28, 2009

Related U.S. Application Data

(60) Provisional application No. 61/000,068, filed on Oct. 23, 2007.

(51) Int. Cl.  
    *G01D 5/34*     (2006.01)

(52) U.S. Cl. ............... 250/231.13; 250/231.14; 341/14; 33/1 PT; 33/707

(58) Field of Classification Search .......... 250/231.13–231.14, 231.16–231.18; 341/11, 13, 14; 33/1 N, 1 PT, 706, 707  
See application file for complete search history.

(56) References Cited

U.S. PATENT DOCUMENTS

| | | | |
|---|---|---|---|
| 6,240,652 B1 * | 6/2001 | Bobel et al. | 33/707 |
| 6,420,697 B1 | 7/2002 | Donner et al. | |
| 6,956,198 B2 | 10/2005 | Alsobrooks et al. | |
| 2004/0046112 A1 | 3/2004 | Durocher | |
| 2004/0217269 A1 | 11/2004 | Kall et al. | |
| 2005/0115087 A1 | 6/2005 | Noltemeyer | |
| 2006/0043271 A1 | 3/2006 | Chin et al. | |
| 2006/0243895 A1 * | 11/2006 | Nordenfelt et al. | 250/231.13 |
| 2007/0152143 A1 | 7/2007 | Koster | |
| 2010/0235054 A1 * | 9/2010 | Hoskins et al. | 701/42 |

\* cited by examiner

*Primary Examiner* — Kevin Pyo  
(74) *Attorney, Agent, or Firm* — Tarolli, Sundheim, Covell & Tummino LLP (57) ABSTRACT

A sensor for sensing the angular position of a rotor includes a code disk rotatable with the rotor. A first light guide is rotatable with the rotor. The light guide directs light from a light source through the code disk to a detector. A second light guide has first and second arms directing light from a light source to the detector. A light modulator modulates the light directed from one of the first and second arms to the detector. A method for determining the angular position of the rotor includes providing the code disk with a plurality of individual designation areas located near the outer peripheral edge of the disk. Each designation area has a plurality of digital bits. The detector detects the digital bits from a selected portion of the code disk. The selected portion is functionally related to the angular position of the rotor. A bit center is determined for each bit of the selected portion. The bit is determined to be a 1 or a 0 by determining a value related to the bit based on the determined bit center and comparing the determined value against a threshold. The determined 1's and 0's are monitored to identify a code word. The angular position of the rotor is identified based upon the identified code word.

5 Claims, 10 Drawing Sheets

SENSOR AND METHOD FOR DETERMINING AN ANGULAR POSITION OF A ROTOR

RELATED APPLICATION

This application claims priority from U.S. Provisional Patent Application Ser. No. 61/000,068, filed Oct. 23, 2007, the subject matter of which is incorporated herein by reference.

TECHNICAL FIELD

The present invention relates to a sensor and method for determining an angular position of a rotor, and, more specifically, to a sensor and method for determining an angular position of a steering wheel of a vehicle.

BACKGROUND OF THE INVENTION

Steering angle sensors are used to determine the angular position of a steering wheel of a vehicle. The steering angle sensor may include a code disk that rotates with the steering wheel. The code disk is at least partially transparent and has an optical coding. A light source is directed toward the code disk. A photosensitive receiver receives the light that traverses the code disk.

SUMMARY OF THE INVENTION

A sensor for sensing an angular position of a rotor of the present invention includes a code disk rotatable with the rotor. A light guide is rotatable with the rotor. The light guide directs light from a light source through the code disk to a detector.

In another aspect of the present invention, a sensor for sensing an angular position of a rotor includes a light guide having first and second arms directing light from a light source to a detector. A light modulator modulates the light directed from one of the first and second arms to the detector.

In another aspect of the present invention, an apparatus for determining an angular position of a rotor includes a code disk secured to the rotor and having a plurality of individual designation areas located near the outer peripheral edge of the disk. Each designated area has a plurality of digital bits and is identified by a code word comprising the plurality of digital bits. The apparatus further includes a detector for detecting the digital bits from a selected portion of the code disk, which is functionally related to the angular position of the rotor. The detector includes means for determining a bit center for each bit of the selected portion of the code disk and bit value determination means for determining whether each bit in the selected portion of the code disk is a 1 or a 0. The bit value determination means determines a value related to each bit in the selected portion of the code disk based on the determined bit center and compares the determined value against a threshold to determine if the bit is a 1 or a 0. The detector also includes word identification means monitoring the determined 1's and 0's to identify a code word and identifying the angular position of the rotor based upon the identified code word.

In another aspect of the present invention, a method for determining an angular position of a rotor comprises the step of securing a code disk to the rotor having a plurality of individual designation areas located near the outer peripheral edge of the disk. Each designation area has a plurality of digital bits and being identified by a code word comprising the plurality of digital bits. The method also comprises the step of detecting the digital bits from a selected portion of the code disk. The selected portion is functionally related to the angular position of the rotor. The method further comprises the steps of determining a bit center for each bit of the selected portion and determining whether each bit in the selected portion of the code disk is a 1 or a 0 by determining a value related to each bit in the selected portion of the code disk based on the determined bit center and comparing the determined value against a threshold. The method still further comprises the steps of monitoring the determined 1's and 0's to identify a code word, and identifying the angular position of the rotor based upon the identified code word.

BRIEF DESCRIPTION OF THE DRAWINGS

The foregoing and other features of the present invention will become more apparent to one skilled in the art upon consideration of the following description of the invention and the accompanying drawings in which.

DESCRIPTION OF EXEMPLARY EMBODIMENTS

A sensor 10 constructed in accordance with a first exemplary embodiment of the present invention is illustrated in FIGS. 1-4. The sensor 10 (FIG. 1) is connected with a rotor 12, such as a steering shaft of a vehicle. A steering wheel (not shown) may be connected with the rotor 12 for rotation with the rotor. The sensor 10 detects an angular position of the rotor 12 about a longitudinal central axis 13 of the rotor. The rotor 12 may rotate 900°, for example, in either direction from an initial straight ahead position. Accordingly, the rotor 12 may rotate between −900° and +900°.

Figure 1:
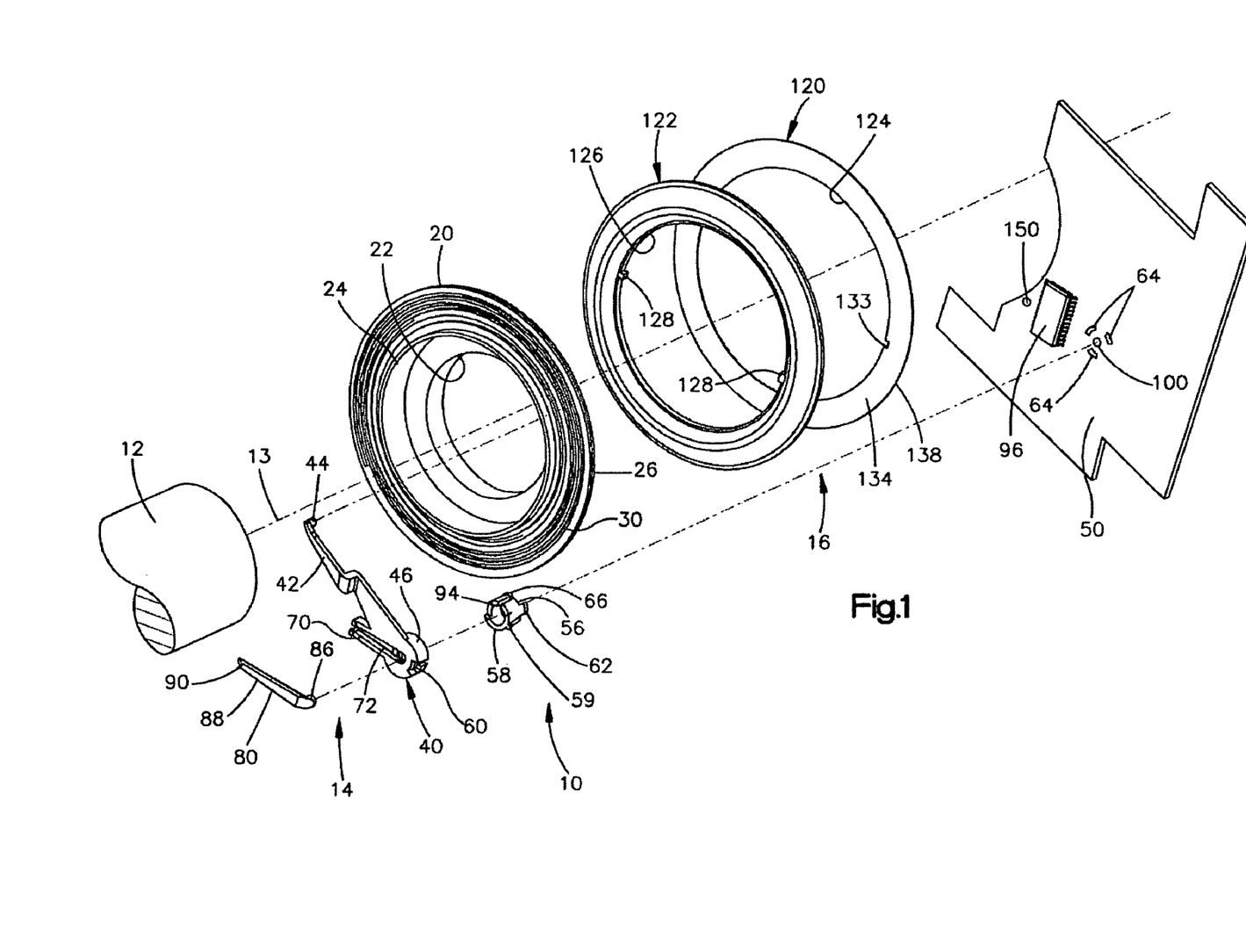
FIG. 1 is a schematic exploded view of a sensor constructed in accordance with a first exemplary embodiment of the present invention.

The sensor 10 includes a turn sensor or counter 14 and an angle sensor 16. The turn sensor or counter 14 senses the number of turns the rotor 12 makes from the initial position. The angle sensor 16 senses the angular position of the rotor 12 between 0° and 360° in any given turn. Therefore, the absolute angular position of rotor 12 relative to the initial position can be determined by combining the number of turns from the initial position sensed by the turn sensor or counter 14 and the angular position sensed by the angle sensor 16.

The turn counter 14 includes a turn disk 20. The turn disk 20 has a central opening 22 through which the rotor 12 extends. The turn disk 20 is connected to the rotor 12 in any desired manner. Accordingly, the turn disk 20 rotates with the rotor 12 about the axis 13.

The turn disk 20 (FIG. 3) has a radially inner portion 24. A flange 26 extends radially outwardly from the inner portion 24. A radially outer surface of the inner portion 24 includes one or more slots 28 extending axially from a lower end of the inner portion, as seen in FIG. 3, toward the flange 26. The flange 26 includes a spiral groove 30 in an upper surface of the flange. The spiral groove 30 may be in the shape of an Archimedes spiral. At each of its outermost and innermost ends, the spiral groove 30 may include an extension groove portion 31 (FIG. 2) that curves back toward and joins the adjacent turn of the spiral groove. Each such groove extension portion 31 would have a bottom surface that is higher than a bottom surface of the remainder of spiral groove 30 at the point where the groove extension portion joins the adjacent turn of the spiral groove.

A tracking member 40 (FIG. 1) has a first arm 42 with an axially extending projection 44. The axially extending projection 44 extends into the groove 30 of the turn disk 20. An end 46 of the tracking member 40 is pivotally connected to a printed circuit board (PCB) 50. The PCB 50 is connected with the vehicle so that the rotor 12 and the turn disk 20 move relative to the PCB. As the turn disk 20 rotates, the groove 30 moves relative to the projection 44, which pivots the tracking member 40 relative to the PCB 50.

Figure 2:
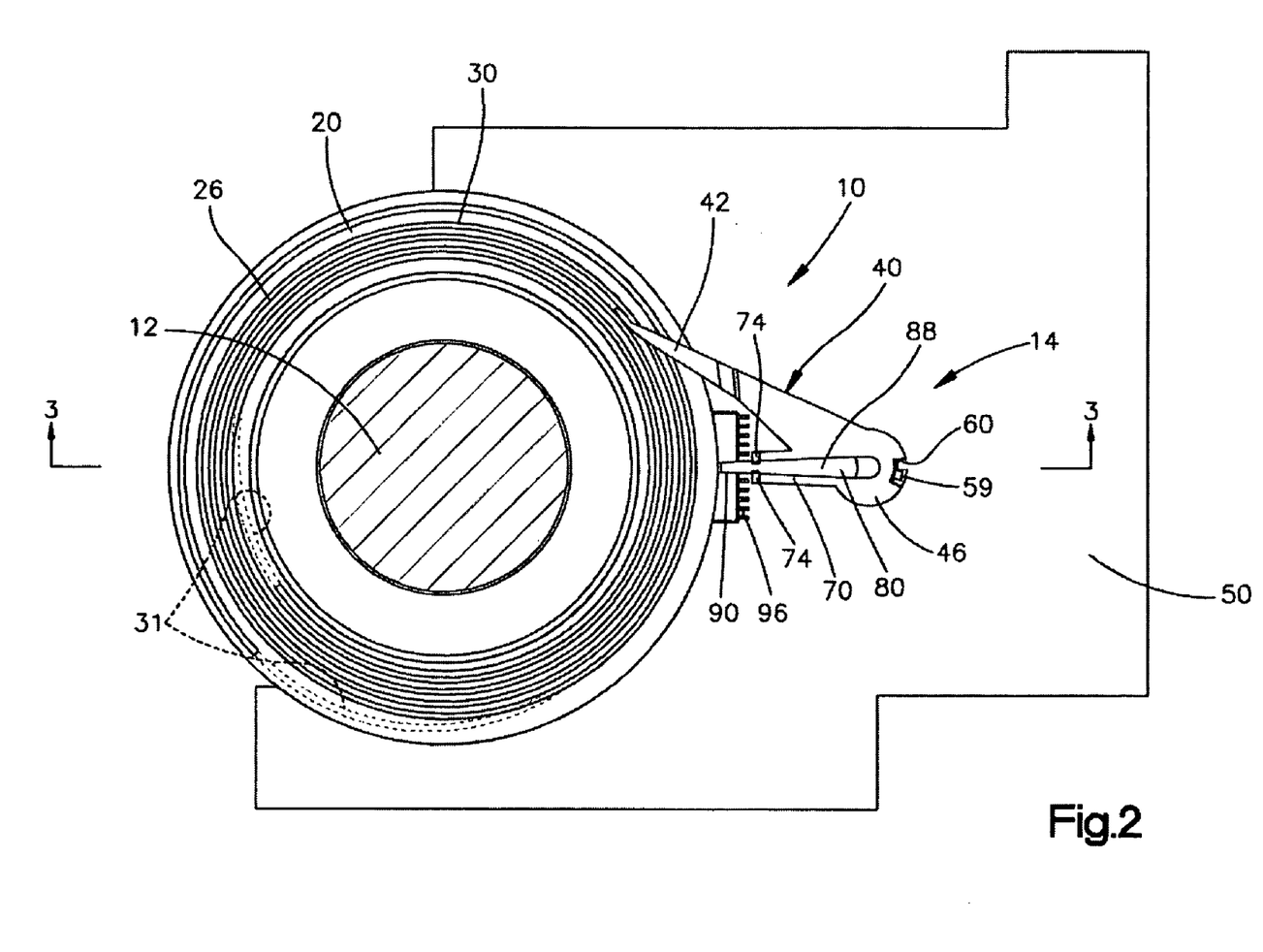
FIG. 2 is a schematic plan view of the sensor of FIG. 1.
Figure 3:
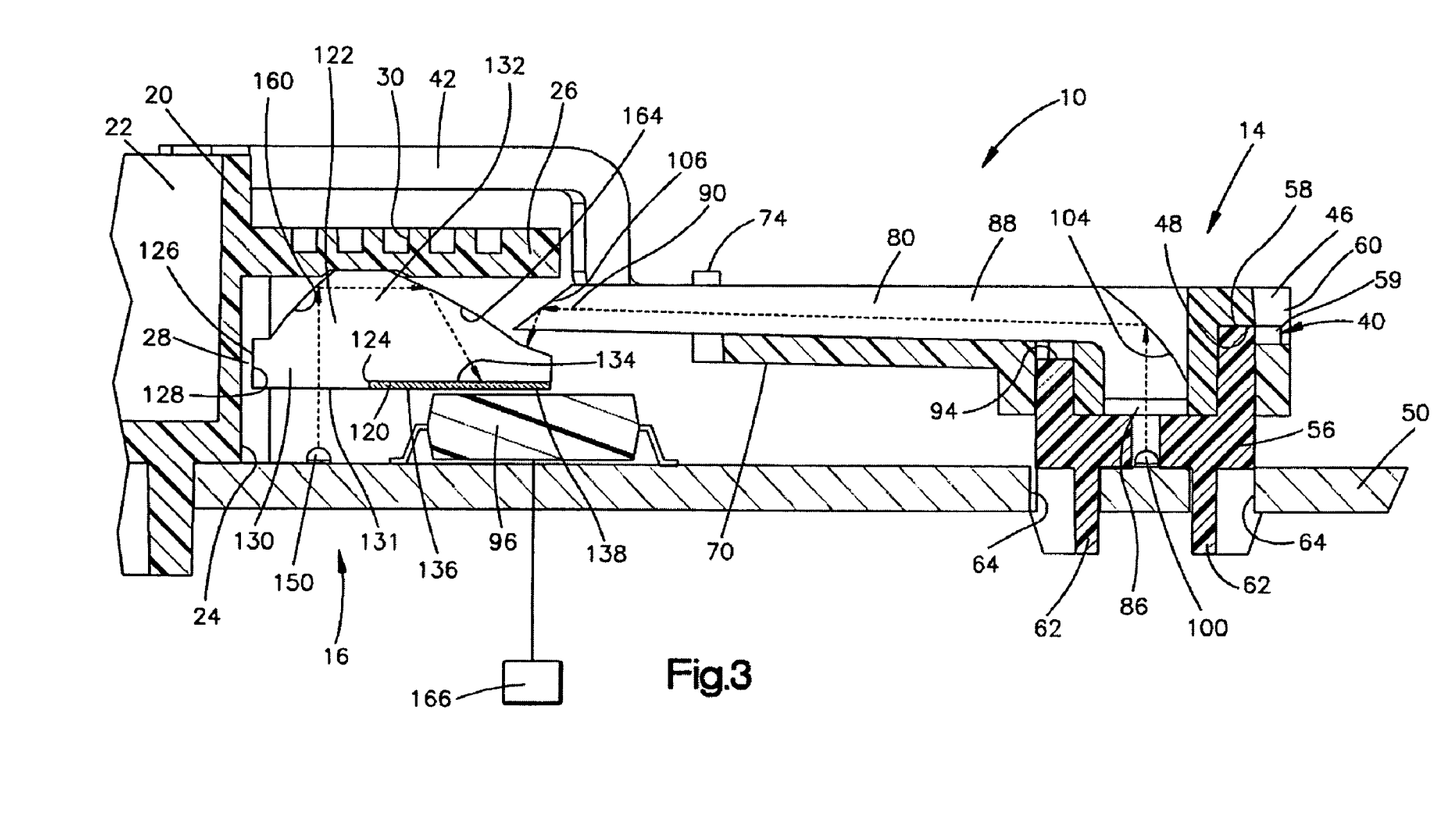
FIG. 3 is a schematic sectional view of the sensor taken along the line 3-3 in FIG. 2.

When the turn disk 20 rotates in a clockwise direction, as viewed in FIG. 2, the tracking member 40 pivots in a clockwise direction relative to the PCB 50. When the turn disk 20 rotates in a counterclockwise direction, as viewed in FIG. 2, the tracking member 40 pivots in a counterclockwise direction relative to the PCB 50. Alternatively, the tracking member 40 may pivot in a counterclockwise direction when the turn disk 20 rotates in a clockwise direction and pivot in a clockwise direction when the turn disk rotates in a counterclockwise direction.

If the spiral groove 30 is formed with one or more groove extension portions 31, the axially extending projection 44 of the tracking member 40 may move beyond the innermost or outermost end of the spiral groove. The groove extension portion 31 would then direct the axially extending projection 44 to move back into the main portion of the spiral groove 30. Because the groove extension portion 31 has a higher bottom surface than the main portion of the spiral groove 30 at the point where the groove extension portion joins the adjacent turn of the spiral groove, the axially extending projection 44 will not move into the groove extension portion prior to reaching the innermost or outermost end of the spiral groove. The foregoing arrangement may help protect the turn sensor or counter 14 against inadvertent damage prior to installation of the sensor 10 in a vehicle.

The end 46 of the tracking member 40 has an annular recess 48 (FIG. 3). A generally cylindrical support member 56 is connected to the PCB 50. The support member 56 extends into the recess 48 to support the tracking member 40 for pivotal movement relative to the PCB 50. The support member 56 has an end surface 58 engaging the tracking member 40. The end surface 58 supports the tracking member 40 for pivotal movement relative to the support member 56.

Figure 4:
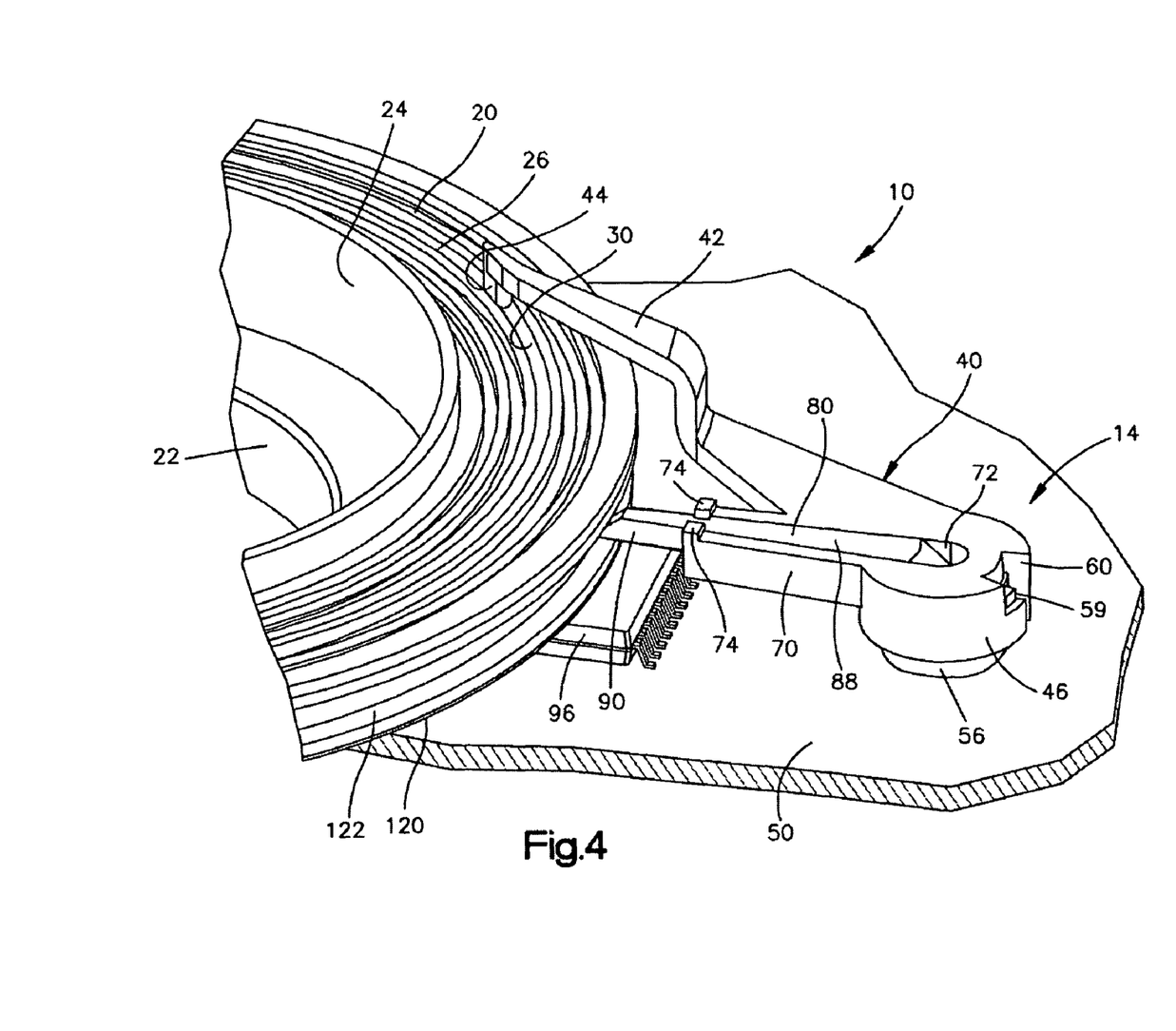
FIG. 4 is a schematic perspective view of a portion of the sensor of FIG. 1.

The support member 56 includes a radially outwardly extending projection 59 (FIGS. 1 and 4). The projection 59 extends into an L-shaped slot 60 in the end 46 of the tracking member 40. The projection 59 on the support member 56 engages the tracking member 40 in the L-shaped slot 60 to connect the tracking member to the support member while permitting pivotal movement of the tracking member relative to the support member and the PCB 50.

The support member 56 includes a plurality of tabs 62 (FIGS. 1 and 3). The tabs 62 snap into openings 64 in the PCB 50 to connect the support member 56 to the PCB. The support member 56 may have an axially extending slot 66 to allow the tabs 62 to snap into the PCB 50.

A second arm 70 of the tracking member 40 (FIG. 4) extends at an angle to the first arm 42. The second arm 70 of the tracking member 40 includes a recess 72 that extends along the length of the second arm. Tabs 74 extend from the second arm 70 on opposite sides of the recess 72 and partially across the recess. The tabs 74 retain a first light guide 80 in the recess 72. The first light guide 80 snaps into the recess 72 in the second arm 70. The light guide 80 pivots with the tracking member 40 relative to the support member 56 and the PCB 50.

The first light guide 80 may be made of a polycarbonate or acrylic material. The first light guide 80 has a first cylindrical end 86 located in the support member 56 (FIGS. 1 and 3). An intermediate portion 88 of the light guide 80 extends between the first end 86 and a second end 90. The intermediate portion 88 extends through a recess 94 in the support member 56.

The light guide 80 extends from the support member 56 to a position adjacent a detector 96 connected to the PCB 50. The second end 90 of the light guide 80 is positioned adjacent the detector 96. The detector 96 may be any desired light detector, such as a photo sensor array. The second end 90 moves relative to the detector 96 as the tracking member 40 pivots relative to the PCB 50.

The light guide 80 directs light from a first photo emitter or light source 100 connected with the PCB 50 to the detector 96. The light source 100 may be connected to the PCB 50 in any desired manner. The light source 100 may be any desired optical emitter, such as an LED.

The first photo emitter or light source 100 is located within the support member 56. The light source 100 directs light into the first end 86 of the light guide 80. The light guide 80 has a first reflective surface 104 (FIG. 3) that directs the light from the light source 100 toward the second end 90 of the light guide. The second end 90 of the light guide 80 has a second reflective surface 106. The second reflective surface 106 of the light guide 80 directs the light received from the first reflective surface 104 toward the detector 96. The light guide 80 sends a signal to different areas of the detector 96 as the light guide pivots relative to the PCB 50. Accordingly, the number of turns the rotor 12 has made from the initial position can be determined by which area of the detector 96 receives the signal from the light guide 80.

The angle sensor 16 includes a code disk 120 and a second light guide 122. The code disk 120 is annular and has a central opening 124 through which the rotor 12 extends. The second light guide 122 is annular and has a central opening 126 through which the rotor 12 extends. The code disk 120 and the light guide 122 are connected to the turn disk 20 and the rotor 12. Accordingly, the code disk 120 and the light guide 122 rotate with the rotor 12 and the turn disk 20 about the axis 13.

The light guide 122 may be made of a polycarbonate or acrylic material. The light guide 122 includes one or more radially inwardly extending protrusions 128 that extend into the slots 28 in the inner portion 24 of the turn disk 20. The protrusions 128 help connect the light guide 122 to the turn disk 20 in a predetermined position relative to the turn disk and the rotor 12. Accordingly, the light guide 122 rotates with the turn disk 20 and the rotor 12.

When viewed in radial section, as shown in FIG. 3, the light guide 122 has a generally frustoconical shape. A first end 130 of the light guide 122 forms a relatively wide base of the frustoconical shape and has a first outer diameter. A second end 132 of the light guide 122 is spaced from the first end 130 along the axis 13 and forms a relatively narrow base of the frustoconical shape. The second end 132 thus has a second outer diameter that is smaller than the first outer diameter. The first end 130, adjacent the radial outer circumference of the light guide 122, is formed with a recess that receives the code disk 120 and that permits a portion of the first end to extend through the opening 124 in the code disk. The first end 130 may also have a radially outwardly extending rib (not shown) that projects into the recess that receives the code disk 120. The rib may extend into and engage a slot 133 (FIG. 1) in the code disk 120 to help connect the code disk to the light guide 122 and the turn disk 20 in a predetermined position. Accordingly, the code disk 120 rotates with the light guide 122, the turn disk 20 and the rotor 12 about the axis 13.

The code disc 120 may be a clear flat material, such as a polycarbonate film, acrylic film, or mylar film. The code disk 120 may be connected to the light guide 122 in any desired manner, such as by adhering the code disk to the light guide. It is contemplated that the code disk 120 may be insert molded with the light guide 122. The code disk 120 may be placed in a mold and polycarbonate or acrylic material injected into the mold to form the light guide 122 and connect the code disk to the light guide.

The code disk 120 has a first end surface 134 that is affixed to the second end 132 of the light guide 122 so that the code disk rotates with the light guide 122. A second end surface 136 of the code disk 120 is spaced away from the first end surface 134 along the axis 13 and faces away from the second end 132 of the light guide 122. The second end surface 136 of the code disk may lie in the same plane as a surface 131 of the first end 130 of the light guide 122. A digital code is formed on the code disk 120 in a radial pattern adjacent a radially outer edge 138 of the code disk. The code may include a plurality of discrete indicia (not shown) spaced apart around the circumference of the code disk 120. The indicia may, for example, include a plurality of openings in the code disk and uninterrupted portions of the code disk that effectively separate the openings from one another. Alternatively, the indicia may include a plurality of opaque and transparent markings on the code disk 120, which may be applied via printing. The indicia of the code may be printed on the second end surface 136 of the code disk or on the first end surface 134. As a further alternative, the digital code may be formed on the code disk 120 in any desired manner.

The light guide 122 guides light from a second photo emitter or light source 150 to the detector 96. The second light source 150 is connected with the PCB 50. The light source 150 may be any desired optical emitter, such as an LED. The light source 150 is connected with the PCB 50 at a location radially inwardly of the code disk 120 and the detector 96. The light source 150 is located axially below the first end 130 of the light guide 122 and below the end surface 131, which is presented toward the light source. Both the light source 150 and the detector 96 are thus located below and adjacent to the first end 130 of the light guide 122 and away from the second end 132 of the light guide.

The light guide 122 (FIG. 3) includes a first frustoconical reflective surface 160. The first reflective surface 160 extends axially away from the first end 130 of the light guide 122 and radially outwardly toward the flange 26 of the turn disk 20. A second frustoconical reflective surface 164 extends radially outwardly and axially away from the flange 26 toward the first end 130.

The second light source 150 directs light axially into the light guide 122 through the first end surface 131 and toward the first reflective surface 160. The first reflective surface 160 directs the light from the second light source 150 in a radially outward direction toward the second reflective surface 164. The second reflective surface 164 of the light guide 122 directs the light received from the first reflective surface 160 in a radially outward direction away from the second end 132 of the light guide 122 toward the outer edge 138 of the code disk 120 and the detector 96. The light passes through the outer edge 138 of the code disk 120 as it travels from the second reflective surface 164 to the detector 96. The angular position of the rotor 12 may be determined from the code sensed by the detector 96.

The indicia (not shown) of the code formed on the code disk 120 are arranged to provide a pseudo-random array of binary digits or bits (i.e., 1's and 0's) around the outer circumference of the code disk. The pseudo-random array of bits forms a unique pattern for each of a multiplicity of predetermined individual designation areas around the circumference of the code disk 120 near the outer peripheral edge 138. Each unique pattern thus identifies a specific portion of the circumference of the code disk 120.

Each designation area has an associated unique code word made up of a plurality of bits (i.e., 1's and 0's). For example, the code disk 120 may include 512 bits and 512 code words, and each code word may include 9 bits, i.e., a 9-bit word made up of a combination of 1's and 0's. Due to the nature of the pseudo-random array of bits, each code word in the preceding example shares 8 bits with each immediately adjacent word. When the second light source 150 is illuminated, the light enters the light guide 122, diffuses, and then is transmitted through the outer peripheral word area portion 138 of the code disk 120 to the detector 96. The light guide 122 and light source 150 are arranged so that the light illuminates at least a 9-bit width of a word area of the outer peripheral edge 138 of the code disk 120.

Each of the 512, 9-bit code words on the code disk is unique so that when the light source 150 passes light through a code disk word to the detector 96, a controller 166 connected to the detector can decode the digital word and determine the angle or angular position of the code disk 120, i.e., the relative angle, to within 360°/512=0.7°. Again, one skilled in the art will appreciate, that the values set forth herein are only given by way of example and other values may be used and other resolutions result. In accordance with one example embodiment of the present invention, the light source 150 is pulsed ON and OFF at a desired frequency to provide a pulse-width-modulated ("PWM") signal at the detector 96.

The functioning or operation of the angle sensor 16 may be enhanced in various ways. For example, the detector 96, which may be a photo sensor array, may only need to detect a number of digital bits, such as nine, corresponding to the length of a single code word identifying a predetermined designation area on the circumference of the code disk 120. If the detector 96, such as a photo sensor array, is made larger or otherwise enabled to detect more digital bits, however, the detector may be capable of recognizing code words for designation areas adjacent to the designation area that is being detected at a predetermined measurement point. Having the capability for recognizing more than one code word provides an increased level of robustness for the angle sensor 16.

Specifically, if the value of one or more digital bits cannot be determined due, for example, to dirt or dust on the detector 96, the detector may nonetheless be able to identify the designation area located at the predetermined measurement point based on the two or more partial code words that can be recognized. The controller 166 may, for example, include a memory unit containing a look-up table with all of the code words used on the code disk 120 and the order of their use around the circumference of the code disk. The code words that include the recognized partial code words and that identify designated segments or code designation areas adjacent to one another on the code disk 120 may identified by reviewing such a look-up table. This process may then lead to identification of the specific designation area at the predetermined measurement point.

Similarly, the detector 96 may only need to include a single linear array of pixels to detect the digital bits represented by the indicia forming the code on the code disk 120. Additional linear arrays of pixels may be used to provide redundancy and an increased level of robustness for the angle sensor 16. For example, individual linear arrays of pixels may be monitored separately by the controller 166 and the digital bits detected by the individual linear arrays of pixels may be compared. Such a comparison may help detect defective or obstructed pixels and other fault conditions.

The functioning of the angle sensor 16 may also be enhanced by strobing or pulsing the light source 1500N and OFF at a desired frequency to provide a pulse-width-modulated signal at the photo sensor array of the detector 96. If the light source 44 is strobed ON and OFF in synchronization with the rate at which the detector 96 is capable of detecting the illuminated and non-illuminated areas produced by the code on the code disk 120, the detector may be able to detect the digital bits represented by the illuminated areas at a faster effective rate without corrupting the detection results.

The functioning of the angle sensor 16 may further be enhanced by using a detector 96 with smaller pixels, which may allow a reduction in the width of the indicia necessary to represent one digital bit. If the indicia are more narrow, more indicia may be used on any given portion of the circumference of the code disk 120, which may allow more and smaller designation areas and a more refined or precise determination of rotational position of the rotor 12. Alternatively, movement of the indicia and thus the digital bits across the detector 96 may be detected at the individual pixel level, which may increase the precision of the determination of the rotational position of the rotor 12.

In accordance with an example embodiment of the present invention, a unique method is used for analyzing each individual bit and bit location. Each bit is represented by a circumferentially-extending portion of the code disk 120, and the circumferential extent or width of each circumferentially-extending portion is the same for each bit. Bits that are 1's have an opening that occupies, for example, seventy-five percent (75%) of the circumferential width of the bit. Bits that are 0's have an opening that occupies, for example, only twenty-five percent (25%) of the circumferential width of the bit. The code disk 120 of this example embodiment has 512 bits and 512 unique code words, each of which words represents an angular position increment of 360°/512=0.7°.

The spacing between the code disk 120 and the detector 96 in this example embodiment is arranged such that each bit on the code disk overlies a predetermined number of pixels on a photo sensor array (not shown) of the detector. This predetermined number of pixels may also be referred to herein as a bit frame. In this example embodiment, the predetermined number of pixels is 7, but the predetermined number of pixels may be any number. In addition, each code word in this example embodiment is made up of 9 bits, but the number of bits in a code word may be greater or less than 9.

In order to detect a complete code word in this example embodiment, the photo sensor array of the detector 96 should include not less than 63 (9×7) pixels. A predetermined measurement point or index point on the photo sensor array is selected, such as a specific pixel of the photo sensor array—for example, the center pixel of the photo sensor array. Based on the light detected by each pixel in the photo sensor array, an edge detection algorithm can determine the edges of the illuminated area of each bit on the photo sensor array and, thus, the edges of the bit. From the detected edges, the width and center of the illuminated area can be determined, from which each bit may be identified as a 1 or a 0 and the location of the center of the bit may be determined. The center of the bit closest to the predetermined measurement point or index point (e.g., the center pixel of the photo sensor array) is the center of the middle bit of a nine bit code word (i.e., the center of the fifth bit in the word) closest to the index point. This code word is thus determined to represent the angular position of the code disk 120 and rotor 12 to the nearest 0.7°.

The foregoing angular position determination may be refined by making further determinations pursuant to this example embodiment of the present invention. In particular, if the center of the middle bit of a nine bit code word (i.e., the center of the fifth bit in the word) precisely overlies the predetermined measurement point or index point on the photo sensor array, the code disk 120 and, therefore, the rotor 12 is at the precise angular position indicated by the code word. If, on the other hand, the center of the middle bit of a nine bit code word overlies a pixel to one side or the other of the index point (e.g., the center pixel of the photo sensor array), the code disk 120 and rotor 12 are at an angular position between the angular positions designated by two adjacent code words. As each bit in a code word overlies seven pixels on the photo sensor array, each pixel effectively represents 0.7°/7=0.1° of angular position. Consequently, the number of pixels ("n") between the center of the middle bit of a nine bit code word and the index point on the photo sensor array represents an offset=n×0.10 from the angular position represented by the code word. For example, if the center of the middle bit of a nine bit code word is located two pixels away from the index point on the photo sensor array (e.g., the center pixel of the photo sensor array), the angular position of the code disk 120 and rotor 12 is 2×0.1°=0.2° offset from the angular position represented by the code word.

Although the foregoing example uses the center of the center bit of a code word to make angular position determinations, any bit in a code word may be used for such purpose. Alternatively, the detected edges of a bit could be used as the reference point to makes angular position determinations, rather than the center of the center bit of a code word.

Also in accordance with an example embodiment of the present invention, an integral or summation of the light levels detected by the seven or other number of pixels overlaid by each bit on the code disk 120 may be used to determine whether each bit within a code word is a one or a zero. Additional angular resolution may be achieved by utilizing the exact center position of several bit positions located on the linear array. Specifically, the detector 96 acquires sample value from a light signal $X(n)$. Then, a 1D Gaussian is performed on the sample so that $g(n)=X(n+1)-X(n)$. From Gaussian result, bit edges are found and the bit centers $y(n)$ are found. The bit center of a reference bit, such as bit 7 ($1^{st}$ bit of middle 9), is found and compared to an ideal pixel or index point on the array of pixels. This yields a fine-tuning factor that may be used for additional angular resolution. Using the bit centers, an integration of each bit is determined (~24 definite integrals), as follows:

$$z(n)=x(y(n)-3)+x(y(n)-2)+x(y(n)-1)+x(y(n))+x(y(n)+1)+x(y(n)+2)+x(y(n)+3)$$

Using these determined integrations, which represent the sum of the light levels detected by seven adjacent pixels centered on the bit center (i.e., three on each side of the center pixel), a threshold ("t") is determined from the highest ("max") and lowest ("min") such integrations or sums of light levels.

$$t = (\max + \min)/2$$

This threshold utilizes the fact that a digital 1 vs a digital 0 in the digital code has a ratio of 3:1 in terms of the light received by the detector 96. Using the determined thresholds, a determination can be made as to whether each bit is a digital 1 or a digital 0, as follows:

$$\begin{cases} z(n) \geq t \to 1 \\ 0 < z(n) < t \to 0 \end{cases}$$

A 9-bit code word can be identified from the determined bits. Finally, angles corresponding to 9-bit codes can be found in a look-up table to find local position (+/−0.7 degrees) and, if desired, the angular position can be fine tuned, based on an offset from an index point or pixel, to +/−0.1 degrees.

As indicated by the foregoing, the method used in accordance with the present invention to determine the angular position of the rotor 12 involves determining a bit center for each bit of a selected group of bits. After the bit center of a bit is determined, a value functionally related to the bit, such as the sum of the light levels detected by a predetermined number of pixels in the bit, is determined. This value is based on the determination of the bit center because the selection of which pixels to include in the light level summation, for example, is based on the determination of the center of the bit. The determined value is compared against a threshold. From this comparison, a determination is made as to whether the bit is a 1 or a 0. By monitoring the determined 1's and 0's, a code word may be identified. The angular position of the rotor may then be determined based upon the identified code word.

As shown in FIG. 3, the light from the first light guide 80 may pass through a radially outer portion of the second light guide 122 and the code disk 120 as the light is directed from the second reflective surface 106 of the first light guide 80 toward the detector 96. The light from the light guide 80 illuminates an area of the detector 96. The area of the detector 96 that receives the signal from the first light source 100 depends on the position of the light guide 80 relative to the detector. The detector 96 sends a signal to the controller 166 indicating the area of the detector that is illuminated by the light source 100. The controller 166 can determine the number of turns the rotor 12 has made from the initial position in response to the signal received from the detector 96. The controller can then determine the absolute position of the rotor 12 relative to the initial position by combining the number of turns sensed by the turn sensor 14 and the angle of the code disk 120 sensed by the angle sensor 16.

A sensor 210 constructed in accordance with a second exemplary embodiment of the present invention is illustrated in FIGS. 5-8. The second exemplary embodiment is generally similar to the first exemplary embodiment. Accordingly, similar numerals will be utilized to designate similar components. The sensor 210 includes a turn sensor or counter 214 and an angle sensor 16. The angle sensor 16 is generally similar to the angle sensor illustrated in FIGS. 1-4 and, therefore, will not be described in detail. The turn sensor or counter 214 senses the number of turns a rotor 12 has made from an initial position. The angle sensor 16 senses the angular position of the rotor 12 between 0° and 360° in any given turn.

The turn sensor or counter 214 (FIG. 5) includes a turn disk 20. The turn disk 20 has a central opening 22 through which the rotor 12 extends. The turn disk 20 is connected to the rotor 12 in any desired manner. Accordingly, the turn disk 20 rotates with the rotor 12 about the axis 13.

The turn disk 20 (FIG. 7) has a radially inner portion 24. A flange 26 extends radially outwardly from the inner portion 24. The inner portion 24 includes slots 28 extending axially from a lower end of the inner portion, as viewed in FIG. 7, toward the flange 26. The flange 26 includes a spiral groove 30 in an upper surface of the flange. The spiral groove 30 may be in the shape of an Archimedes spiral. At each of its outermost and innermost ends, the spiral groove 30 may include an extension groove portion (not shown) that curves back toward and joins the adjacent turn of the spiral groove, as previously described with respect to the embodiment of the invention shown in FIGS. 1-4.

A tracking member 240 (FIGS. 5 and 8) has an arm 242 with an axially extending projection 244. Although the arm 242 is shown as having an upward step or extending upward from the remainder of the tracking member 240, the arm 242 may be at the same level as the remainder of the tracking member. The axially extending projection 244 extends into the groove 30 of the turn disk 20. An end 246 of the tracking member 240 is pivotally connected to a printed circuit board (PCB) 50. The PCB 50 is connected with the vehicle so that the rotor 12 and the turn disk 20 move relative to the PCB. The groove 30 moves relative to the projection 244 when the turn disk 20 rotates to pivot the tracking member 240 relative to the PCB 50.

Figure 6:
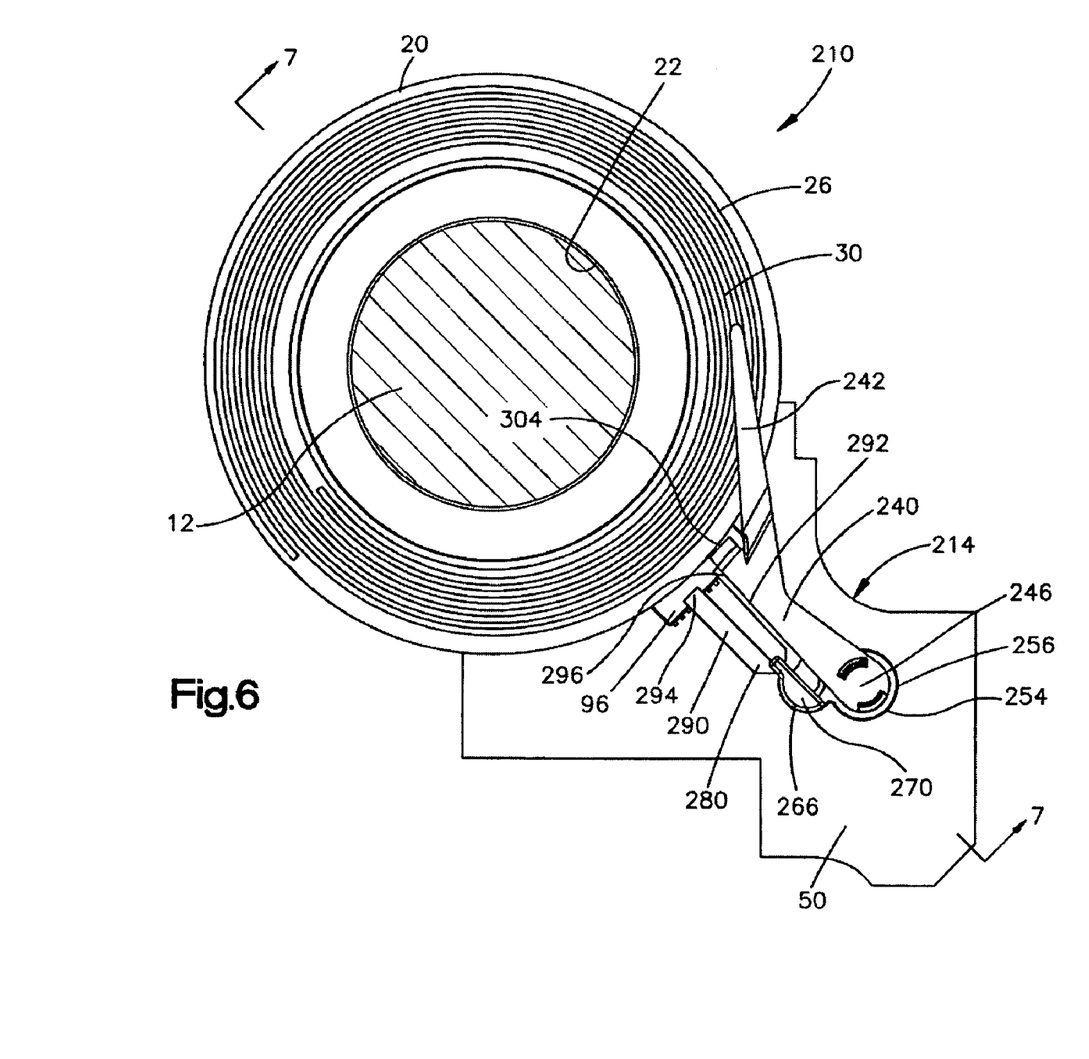
FIG. 6 is a schematic plan view of the sensor of FIG. 5.

When the turn disk 20 rotates in a clockwise direction, as viewed in FIG. 6, the tracking member 240 pivots in a clockwise direction relative to the PCB 50. When the turn disk 20 rotates in a counterclockwise direction, as viewed in FIG. 6, the tracking member 240 pivots in a counterclockwise direction relative to the PCB 50.

The end 246 of the tracking member 240 has a support portion 248 with tabs 250. The support portion 248 and tabs 250 extend into an opening 252 of a first cylindrical portion 254 of a support member 256 connected to the PCB 50. The tabs 250 snap into the first portion 254 of the support member 256 to connect the tracking member 240 to the support member. Cylindrical outer surfaces 258 of the support portion 248 engage an inner cylindrical surface 262 of the first portion 254. An axial end surface 264 of the cylindrical portion 254 engages the tracking member 240. The inner cylindrical surface 262 and the end surface 264 support the tracking member 240 for pivotal movement relative to the cylindrical portion 254 and the PCB 50.

Figure 5:
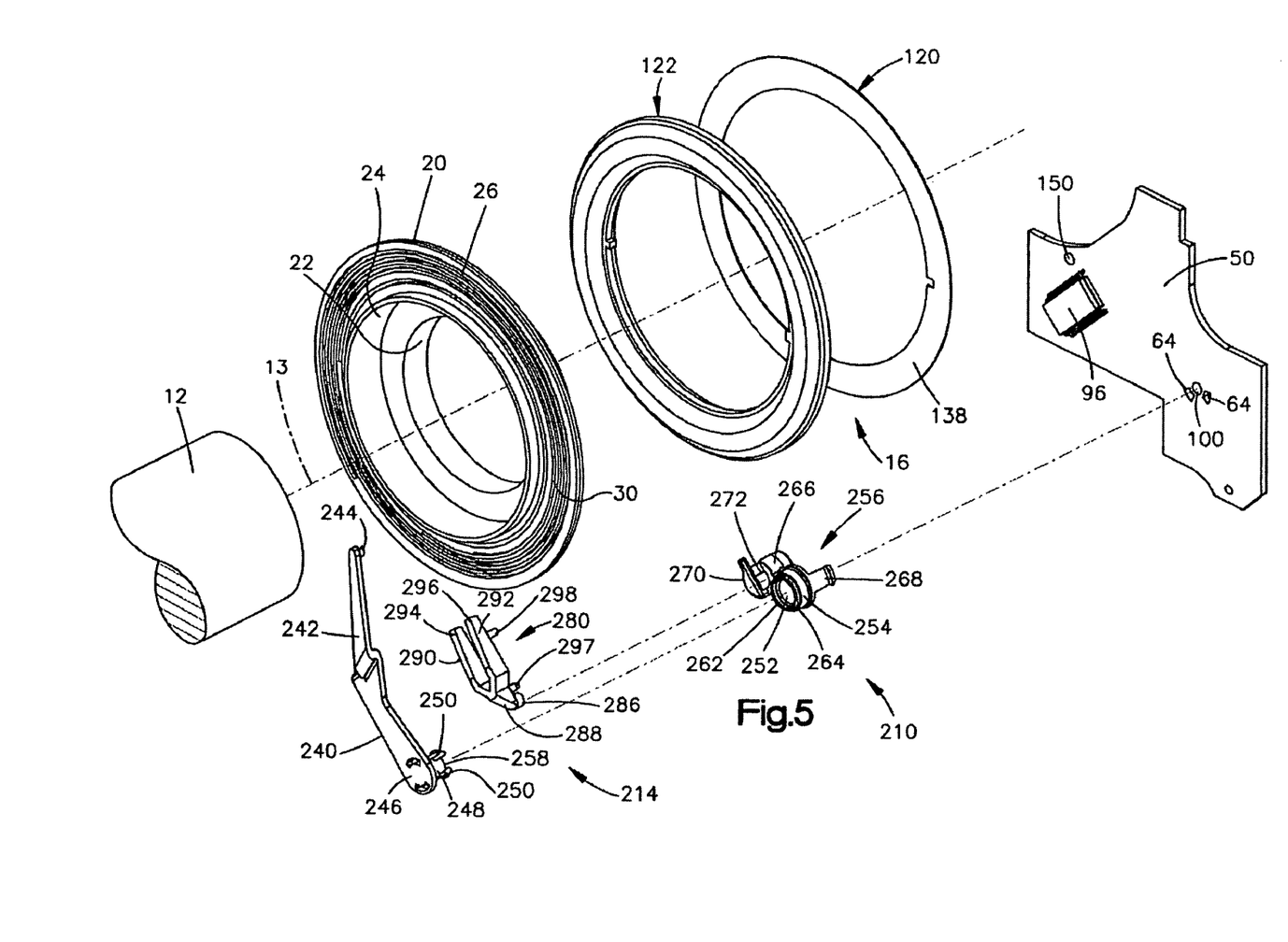
FIG. 5 is a schematic exploded view of a sensor constructed in accordance with a second exemplary embodiment of the present invention.

The support member 256 includes a second cylindrical portion 266 adjacent the first cylindrical portion 254. A plurality of tabs 268, one of which is shown in FIG. 5, extend from the first and second portions 254, 266. The tabs 268 snap into openings 64 in the PCB 50 to connect the support member 256 to the PCB.

The second cylindrical portion 266 of the support member 256 has a cap 270 defining a semicircular opening 272. The cap 270 engages a first light guide 280 to connect the light guide to the PCB 50. The light guide 280 extends through the opening 272 in the second portion 266 of the support member 256.

The first light guide 280 (FIGS. 5 and 7) has a cylindrical portion 286 located in the second cylindrical portion 266 of the support member 256. An intermediate portion 288 extends from the cylindrical portion 286. A first arm 290 of the light guide 280 extends from the intermediate portion 288. A second arm 292 extends from the intermediate portion 288 generally parallel to the first arm 290.

The first and second arms 290 and 292 of the light guide 280 extend from the support member 256 to a position adjacent to a detector 96 connected to the PCB 50. An end 294 of the first arm 290 and an end 296 of the second arm 292 are positioned adjacent the detector 96.

Figure 7:
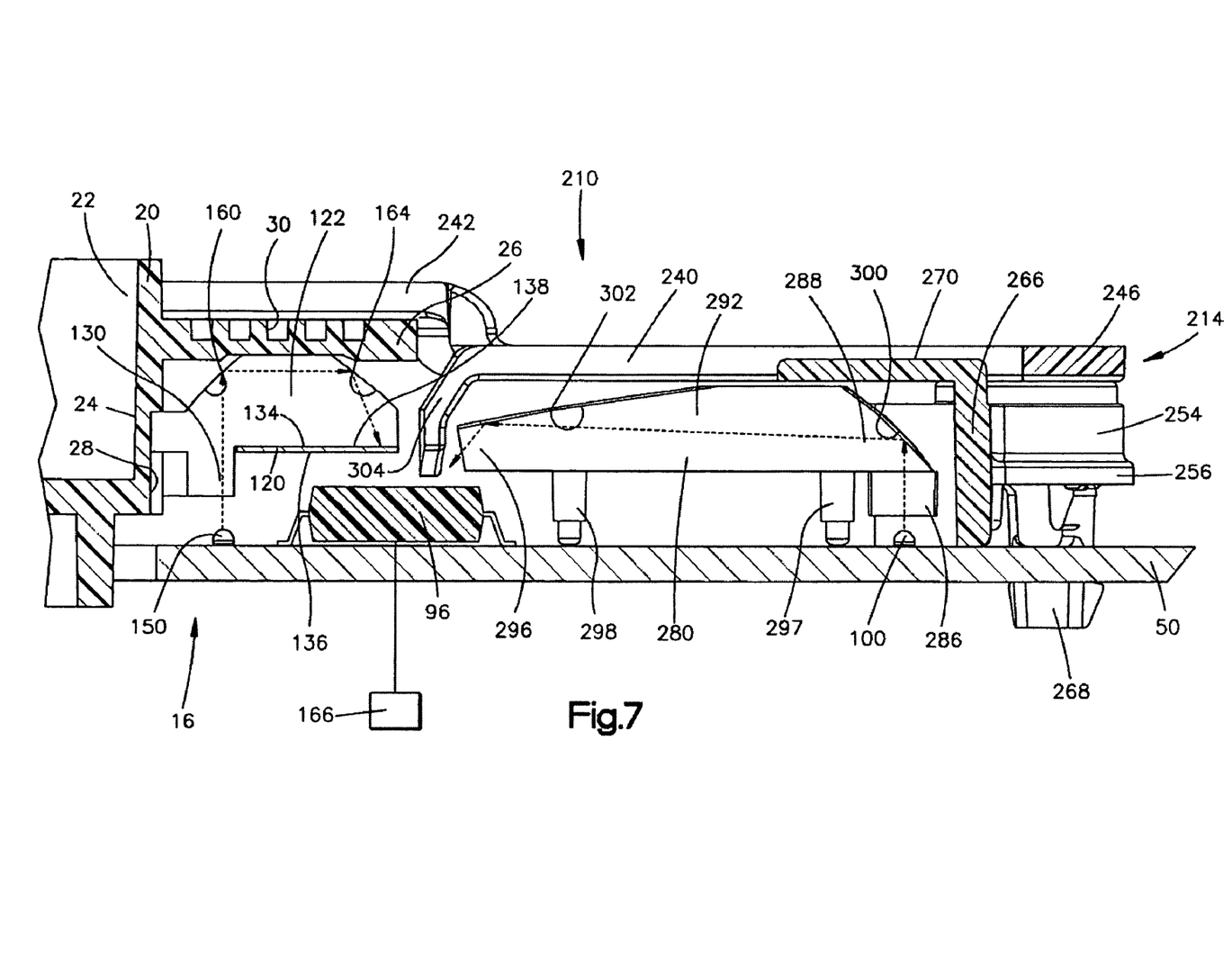
FIG. 7 is a schematic sectional view of the sensor taken along the line 7-7 in FIG. 6.
Figure 8:
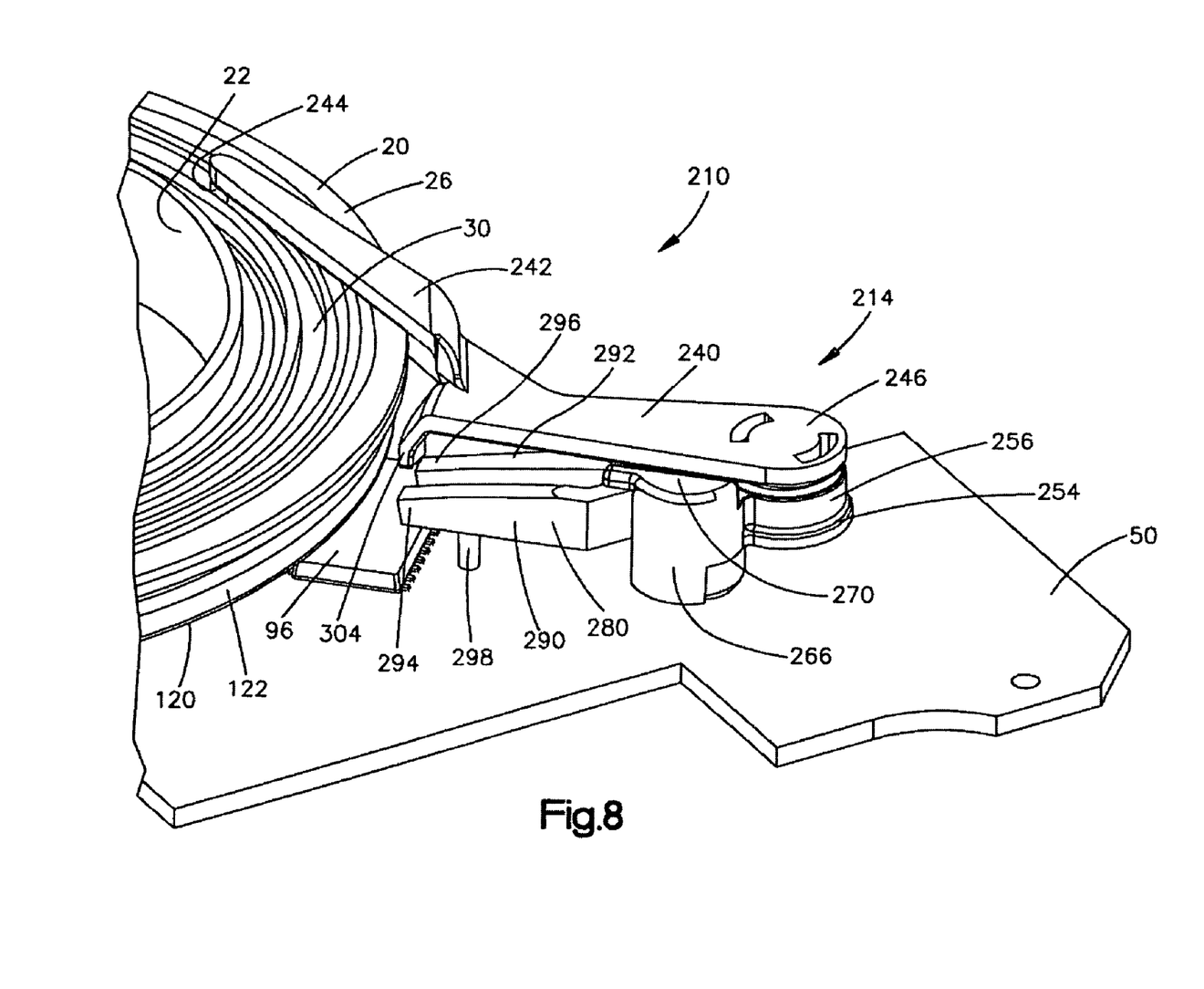
FIG. 8 is a schematic perspective view of a portion of the sensor of FIG. 5.

A support 297 extends from the intermediate portion 288 of the light guide 280 (FIGS. 5 and 7). The support 297 engages the PCB 50. Supports 298, one of which is shown in FIG. 7, extend from each of the arms 290, 292 and engage the PCB 50. The supports 297 and 298 may be fixedly connected to the PCB 50.

The light guide 280 (FIG. 7) directs light from a first light source 100 connected with the PCB 50 to the detector 96. The light source 100 may be any desired optical emitter, such as an LED. The first light source 100 is located within the second cylindrical portion 266 of the support member 256. The light source 100 directs light into the cylindrical portion 286 of the light guide 280. The light guide 280 has a first reflective surface 300 that directs the light from the light source 100 toward the first and second arms 290 and 292. The light guide 280 splits the light emitted by the light source 100 and directs the light to each of the arms 290 and 292. The ends 294, 296 of the first and second arms 290, 292 have reflective surfaces 302, one of which is shown in FIG. 7. The reflective surfaces 302 direct the light received from the first reflective surface 300 toward the detector 96.

The tracking member 240 includes a downwardly extending light modulator or shutter 304, as viewed in FIG. 7. The light modulator 304 extends between the end 296 of the second arm 292 and the detector 96. The light modulator 304 moves with the tracking member 240 relative to the light guide 280. The light modulator 304 may prevent light emitted from the end 296 of the second arm 292 from reaching the detector 96. The amount of light blocked by the light modulator 304 depends on the position of the tracking member 240 relative to the light guide 280. The light modulator 304 permits more light to pass from the second arm 292 to the detector 96 when the tracking member 240 pivots in the clockwise direction. The light modulator 304 blocks more light from passing from the second arm as the tracking member 240 pivots in the counterclockwise direction. Although the light modulator 304 is described as blocking light from the second arm 292, the light modulator may modulate the light traveling from the second arm 292 to the detector 96 in any desired manner. It is contemplated that the light modulator 304 may have a reflective taper, a variable diaphragm, or a variable density filter pattern.

A controller 166 receives signals from the detector 96 indicating the quantity of light received by the detector from each of the arms 290 and 292 of the light guide 280. The quantity of light received by the detector 96 from the first arm 290 is not modulated. The quantity of light received by the detector 96 from the first arm 290 of the light guide 280 is compared to the quantity of light received by the detector from the second arm 292. The difference in the quantity of light received by the detector 96 indicates the number of turns the rotor 12 has made from the initial position. Other properties of the light received by the detector 96 from the arms 290, 292, such as the frequency of the light or the phase shift of the light, may be compared to determine the number of turns the rotor has made.

The angle sensor 16 includes a code disk 120 and a second light guide 122. The code disk 120 and the light guide 122 are connected to the turn disk 20 and the rotor 12. Accordingly, the code disk 120 and the light guide 122 rotate with the rotor 12 and the turn disk 20 about the axis 13.

As in the embodiment of the invention shown in FIGS. 1-4, a digital code is printed on an axial end surface 136 in a radial pattern adjacent a radially outer edge 138. Alternatively, the digital code may be printed on an axial end surface 134. The digital code may be applied to the code disk 120 in any desired manner.

The light guide 122 guides light from a second light source 150 to the detector 96. The second light source 150 is connected with the PCB 50. The light source 150 is connected with the PCB 50 at a location radially inwardly of the code disk 120 and the detector 96. The light source 150 is located axially below the end 130 of the light guide 122.

The second light source 150 directs light axially into the light guide 122 toward the first reflective surface 160. The first reflective surface 160 directs the light from the second light source 150 in a radially outward direction toward the second reflective surface 164. The second reflective surface 164 of the light guide 122 directs the light received from the first reflective surface 160 in an axial and radially outward direction toward the outer edge 138 of the code disk 120 and the detector 96. The light passes through the outer edge 138 of the code disk 120 as it travels from the second reflective surface 164 to the detector 96. The angular position of the rotor 12 may be determined from the code sensed by the detector 96.

The code disk 120 includes a plurality of individual code segments or code designation areas located near the outer peripheral edge 138. Each code segment or code designation area has an associated code word made up of a plurality of bits (i.e., 1's and 0's). For example, the code disk 120 may include 512 code words, and each code word may include 9 bits of information, i.e., a 9-bit word made up with a combination of 1's and 0's. When the light source 150 is illuminated, the light enters the light guide 122, diffuses, and then is transmitted through the outer peripheral word area portion 138 of the code disk 120 to the detector 96. The light guide 122 and light source 150 are arranged so that the light illuminates at least a 9-bit width of a word area of the outer peripheral edge 138 of the code disk 120.

Each of the 512, 9-bit code words on the code disk is unique so that when the light source 150 passes light through the code disk word to the detector 96, the controller 166 connected to the detector can decode the digital word and determine the angle or angular position of the code disk 120, i.e., the relative angle, within 360°/512=0.7°. One skilled in the art will appreciate, that the values set forth herein are only given by way of example and other values may be used and other resolutions result. The light source 150 may be pulsed ON and OFF at a desired frequency to provide a pulse-width-modulated ("PWM") signal at the detector 96.

Each individual bit and bit location represented by each illuminated 7-pixel width area may be analyzed in a manner similar to that described in connection with the first exemplary embodiment of FIGS. 1-4 to aid in identification of whether a bit value is a 0 or 1.

The light received by the detector 96 from the first and second arms 290 and 292 of the first light guide 280 is compared to determine the number of turns the rotor 12 has made from the initial position. The controller can then determine the absolute position of the rotor 12 relative to the initial position by combining the number of turns sensed by the turn sensor or counter 214 and the angle of the code disk 120 sensed by the angle sensor 16.

Although the sensors 10, 210 are described as including turn sensors or counters 14, 214 and angle sensors 16, the turn sensors may be used in combination with any angle sensor and the angle sensors may be used with any desired turn sensors. Also, the sensors 10, 210 may be used to determine the relative angular positions between any members that move relative to each other about an axis.

Figure 9:
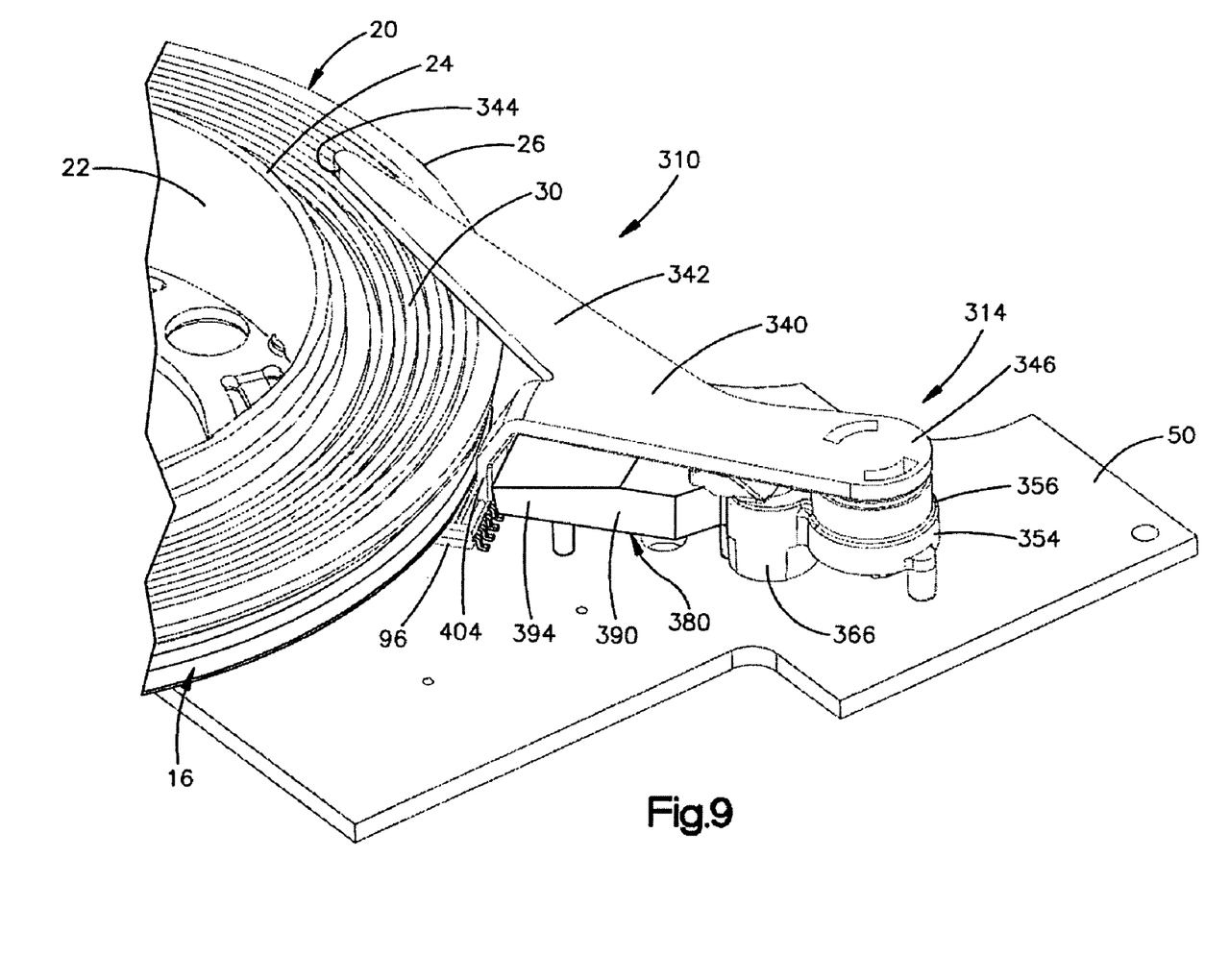
FIG. 9 is a schematic perspective view of a portion of a sensor constructed in accordance with a third exemplary embodiment of the present invention.
Figure 10:
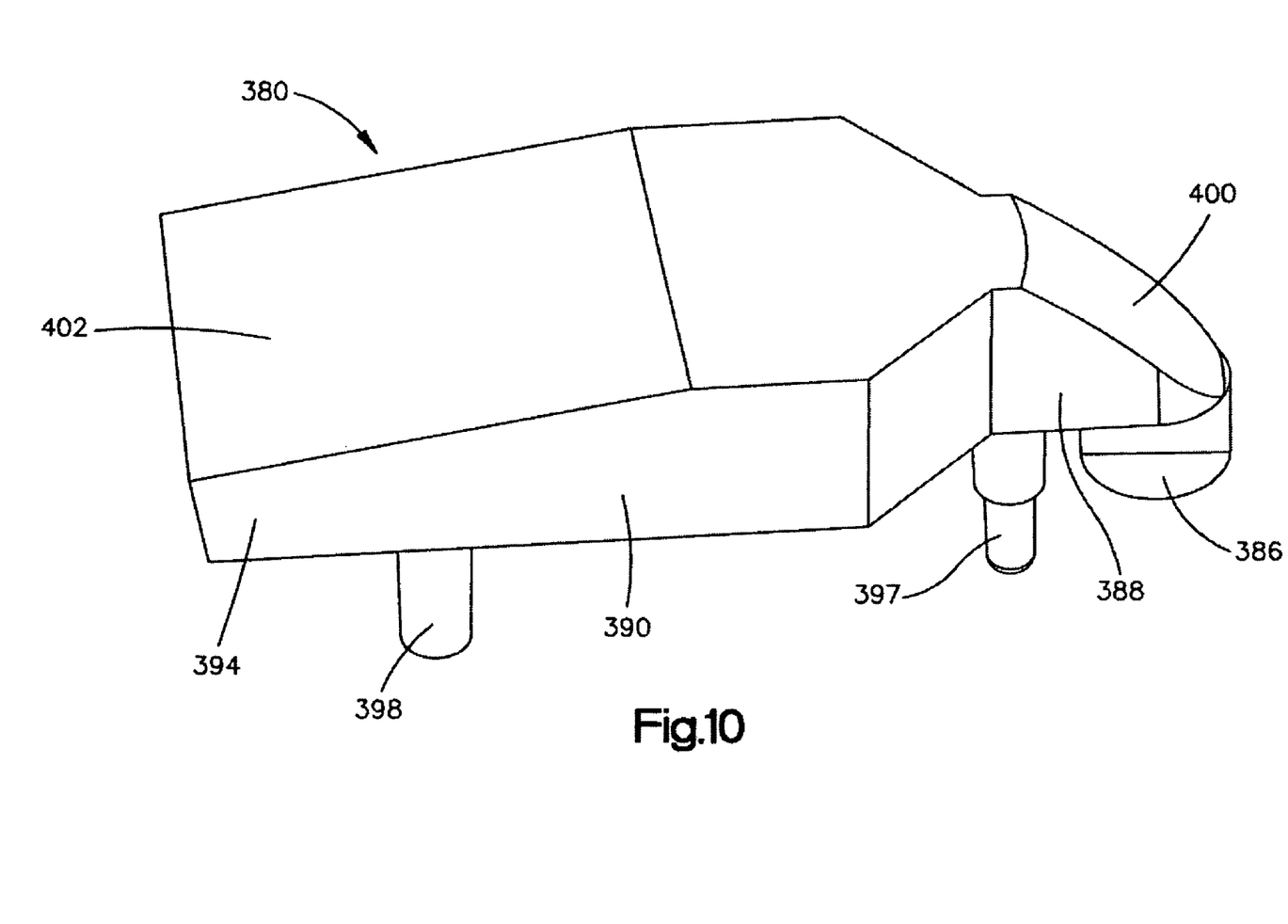
FIG. 10 is a schematic perspective view of one component of the sensor of FIG. 9.

A sensor 310 constructed in accordance with a third exemplary embodiment of the present invention is illustrated in FIGS. 9-10. The third exemplary embodiment is substantially the same as the second exemplary embodiment and includes the same components as the embodiment of FIGS. 5-8, except for the turn sensor or counter 214. Accordingly, similar numerals will be used to designate similar components. The sensor 310 includes a turn sensor or counter 314 and an angle sensor 16. The angle sensor 16 is substantially the same as the angle sensor illustrated in FIGS. 1-4 and, therefore, will not be described in detail. The turn sensor or counter 314 senses the number of turns a rotor (not shown) has made from an initial position. The angle sensor 16 senses the angular position of the rotor (not shown) between 0° and 360° in any given turn.

The turn sensor or counter 314 includes a turn disk 20. The turn disk 20 has a central opening 22 through which the rotor extends. The turn disk 20 is connected to the rotor in any desired manner and rotates with the rotor about a central axis. The turn disk 20 has a radially inner portion 24 and a flange 26 that extends radially outwardly from the inner portion. The flange 26 includes, in an upper surface, a spiral groove 30, which may be in the shape of an Archimedes spiral.

A tracking member 340 has an arm 342 with an axially extending projection 344. The axially extending projection 344 extends into the groove 30 of the turn disk 20. An end 346 of the tracking member 340 is pivotally connected to a printed circuit board (PCB) 50. The PCB 50 is connected with the vehicle so that the rotor and the turn disk 20 move relative to the PCB. The groove 30 moves relative to the projection 344 when the turn disk 20 rotates to pivot the tracking member 340 relative to the PCB 50.

The end 346 of the tracking member 340 has a support portion (not shown) that extends into an opening of a first cylindrical portion 354 of a support member 356 connected to the PCB 50 and that is connected to the support member. The support member 356 supports the tracking member 340 for pivotal movement relative to the support member and the PCB 50. The support member 356 includes a second cylindrical portion 366 that is located adjacent the first cylindrical portion 354 and that is connected to the PCB 50 to connect the support member 356 to the PCB. The second cylindrical portion 366 of the support member 356 engages a first light guide 380 to connect the light guide to the PCB 50. The light guide 380 has a cylindrical portion 386 located in the second cylindrical portion 366 of the support member 356. An intermediate portion 388 extends from the cylindrical portion 386. An arm 390 of the light guide 380 extends from the intermediate portion 388. The arm 390 of the light guide 380 extend from the support member 356 to a position adjacent to a detector 96 connected to the PCB 50. An end 394 of the arm 390 is positioned adjacent the detector 96. A support 397 extends from the intermediate portion 388 of the light guide 380 and engages the PCB 50. A support 398 extends from the arm 390 and engages the PCB 50. The supports 397 and 398 may be fixedly connected to the PCB 50.

The light guide 380 directs light from a first light source (not shown) connected with the PCB 50 to the detector 96. The first light source may be any desired optical emitter, such as an LED. The first light source is located within the second cylindrical portion 366 of the support member 356 and directs light into the cylindrical portion 386 of the light guide 380. The light guide 380 has a first reflective surface 400 that directs the light from the light source 100 toward the end 394 of the arm 390. The end 394 of the arm 390 has a reflective surface 402, which directs the light received from the first reflective surface 400 toward the detector 96.

The tracking member 340 includes a downwardly extending light modulator or shutter 404, which extends between the end 394 of the arm 390 and the detector 96. The light modulator 404 moves with the tracking member 340 relative to the light guide 380. The light modulator 404 may prevent light emitted from the end 394 of the arm 390 from reaching the detector 96. The location at which light emitted from the end 394 of the arm 390 is blocked by the light modulator 404 depends on the position of the tracking member 340 relative to the light guide 380. As the tracking member 340 pivots in either the clockwise or counter-clockwise direction, the location at which light emitted from the end 394 of the arm 390 is blocked by the light modulator moves across the detector 96. Although the light modulator 404 is described as blocking light from the arm 390, the light modulator may modulate the light traveling from the arm 390 to the detector 96 in any desired manner. It is contemplated that the light modulator 404 may have a reflective taper, a variable diaphragm, or a variable density filter pattern.

A controller (not shown) receives signals from the detector 96 indicating the location at which light emitted from the end 394 of the arm 390 is blocked by the light modulator 404. In one example embodiment of the invention, the detector 96 is a linear photo sensor array that includes a multiplicity of pixels. As the light modulator 404 moves relative to the end 394 of the arm 390, the location at which light emitted from the end of the arm is blocked by the modulator moves along the linear array of pixels. To determine this location, the controller performs a process, which may involve executing an algorithm, to identify the pixel with the lowest detected light value, which is the darkest pixel position on the linear array. The pixel identified by this process is presumed to be the location at which light emitted from the end 394 of the arm 390 is blocked by the light modulator 404. Using the angular position determined by the angle sensor 16 and, for example, a curve fitting process or a look-up table, the controller correlates the identified pixel with the number of turns that the turn disk 20 and the rotor have made from the initial position.

In an example of the third embodiment of the present invention, in which the rotor is capable of turning three complete rotations or 1080° in each direction from the initial position, the linear array is searched for the minimum value (i.e., the darkest value) in the span of the sensor. The pixel at which this dark spot is located is determined to be the location of the shutter or light modulator and, thus, the turn counter. The determined location, which is identified by the "number" assigned to the particular pixel as part of a sequential numbering of the pixels from 1 to n along the array, is "fitted" to an ideal turn curve in order to identify the number of turns that the turn disk and the rotor have made from the initial position. In the curve fitting process, the angle determined from the angle sensor is used to calculate a set of all possible locations from the ideal turn curve. The formula used to calculate the locations is: (360×N)+base angle −1080, where N=0 . . . 5 and the base angle is the angle determined by the angle sensor. The constant 1080 shifts the reference to allow for positive and negative angles centered around the initial or straight ahead position. The pixel location or "number" determined by the turn counter is compared to the set of possible locations or pixel numbers and the "best" fit is then selected as the actual number of turns from the initial or straight ahead position.

For example, if the pixel location or "number" determined by the turn counter is pixel number 35 and the angle determined by the angle sensor is 20°, the set of possible angle positions calculated by the foregoing formulation will be: −1060°, −700°, −340°, +20°, +380°, and +7400 (where 0° is straight ahead, negative angles are counterclockwise from the straight ahead position, and positive angles are clockwise from the straight ahead position). From the ideal turn curve, which may be established by calculation or empirical testing, the foregoing angles may correspond to pixel locations 32, 64, 96, 128, 160, and 192. Because the pixel location determined by the turn counter is pixel 35 and the closest possible pixel location from the ideal turn curve is pixel 32, the result of the curve fitting process is a determination that the turn disk and rotor are in the turn farthest in the counter-clockwise direction from the initial position, which may be designated turn 0 (or turn 1).

From the above description of the invention, those skilled in the art will perceive improvements, changes and modifications. Such improvements, changes and modifications within the skill of the art are intended to be covered by the appended claims.

Having described the invention, the following is claimed:

1. A sensor for sensing an angular position of a rotor, said sensor comprising:
   a code disk rotatable in response to rotation of the rotor;
   a first light source and a second light source;
   a first light guide rotatable with the rotor and a second light guide, said first light guide directing light from said first light source through said code disk to a detector, said second light guide having first and second arms directing light from said second light source to said detector; and
   a light modulator that modulates the light directed from one of said first and second arms to said detector.

2. A sensor according to claim 1 further including a controller, said detector providing signals to said controller indicative of a characteristic of the light received by said detector from each of the first and second arms.

3. A sensor according to claim 2 wherein said controller compares said signals to determine a number of turns that the rotor has been rotated from an initial position.

4. A sensor according to claim 1 wherein said modulator is movable in response to rotation of the rotor to modulate the light from said one of said first and second arms.

5. A sensor for sensing an angular position of a rotor, said sensor comprising:
   a code disk rotatable in response to rotation of the rotor, wherein said code disk has a plurality of individual designation areas located near an outer peripheral edge of the disk, each designation area having a plurality of digital bits and being identified by a code word comprising said plurality of digital bits;
   a light guide rotatable with the rotor;
   a light source, said light guide directing light from said light source through said code disk to a detector, said detector detecting the digital bits from a selected portion of said code disk, said selected portion being functionally related to the angular position of said rotor, said detector including means for determining a bit center for each bit of the selected portion of the code disk,
   a bit value determination means for determining whether each bit in the selected portion of the code disk is a 1 or a 0, said bit value determination means determining a value related to each bit in the selected portion of the code disk based on the determined bit center and comparing the determined value against a threshold to determine if said bit is a 1or a 0, and
   word identification means that monitor the determined 1's and 0's to identify a code word and identify the angular position of the rotor based upon the identified code word.

* * * * *